United States Patent [19]

Brennan

[11] Patent Number: 5,007,743
[45] Date of Patent: Apr. 16, 1991

[54] FOOD METERING DISH

[76] Inventor: Leanne M. Brennan, R.D. #2, Box 475, Drums, Pa. 18222

[21] Appl. No.: 439,164

[22] Filed: Nov. 20, 1989

[51] Int. Cl.$^5$ .......................... G01K 1/14; G01F 15/00
[52] U.S. Cl. ........................................ 374/141; 33/524; 73/426; 206/545; 220/23.83; 220/427
[58] Field of Search ................... 33/522, 524; 73/426; 374/141, 150, 157; 220/23.83, 22.3, 356, 427; 206/542, 545; 426/87, 88, 114, 120

[56] References Cited

U.S. PATENT DOCUMENTS

| D. 200,867 | 4/1965 | Haifley | D7/27 |
|---|---|---|---|
| 1,651,485 | 12/1927 | Thesen | D7/50 |
| 2,096,825 | 10/1937 | Roman | 426/114 |
| 2,526,602 | 10/1950 | Crumrine | 220/23.83 |
| 2,556,782 | 6/1951 | Ventens . | |
| 3,250,422 | 5/1966 | Parish | 220/23.83 |
| 3,498,136 | 3/1970 | Le May . | |
| 3,530,736 | 11/1950 | Sheldon | 220/23.83 |
| 3,655,089 | 4/1972 | Tower | 220/356 |
| 3,850,333 | 11/1974 | Reichert | 206/545 |
| 3,877,603 | 4/1975 | Holz | 220/23.83 |
| 3,883,029 | 5/1975 | Wyatt | 220/23.83 |
| 3,938,688 | 2/1976 | Ryan | 206/545 |
| 4,165,565 | 8/1979 | Cloutier et al. . | |
| 4,334,361 | 6/1982 | Gorski et al. . | |
| 4,732,274 | 3/1988 | Bouton | 220/23.83 |

FOREIGN PATENT DOCUMENTS 2014411  11/1971  Fed. Rep. of Germany ...... 374/141

Primary Examiner—Thomas B. Will
Attorney, Agent, or Firm—Leon Gilden

[57] ABSTRACT

An apparatus is set forth for use as a dieting aid by individuals, wherein a dish member includes a continuous surrounding wall defining an interior cavity. The interior cavity includes first and second concave recesses for receiving metered containers therewithin that each include metering designations consistent with dieting portions available to an individual. The containers each include sealing lids selectively securable thereon for maintaining freshness and temperature within the containers. The continuous wall includes a cavity filled with a mineral oil to retain heat within the cavity and impart such heat to food contained within the interior cavity of the dish. A thermometer is integrally and optionally formed to an exterior surface of the wall, and additionally the dish may include a medial partition wall with spaced pairs of ribs containing selectively partitionable partition walls between the ribs for selective control of food portions contained between the partition walls.

1 Claim, 6 Drawing Sheets

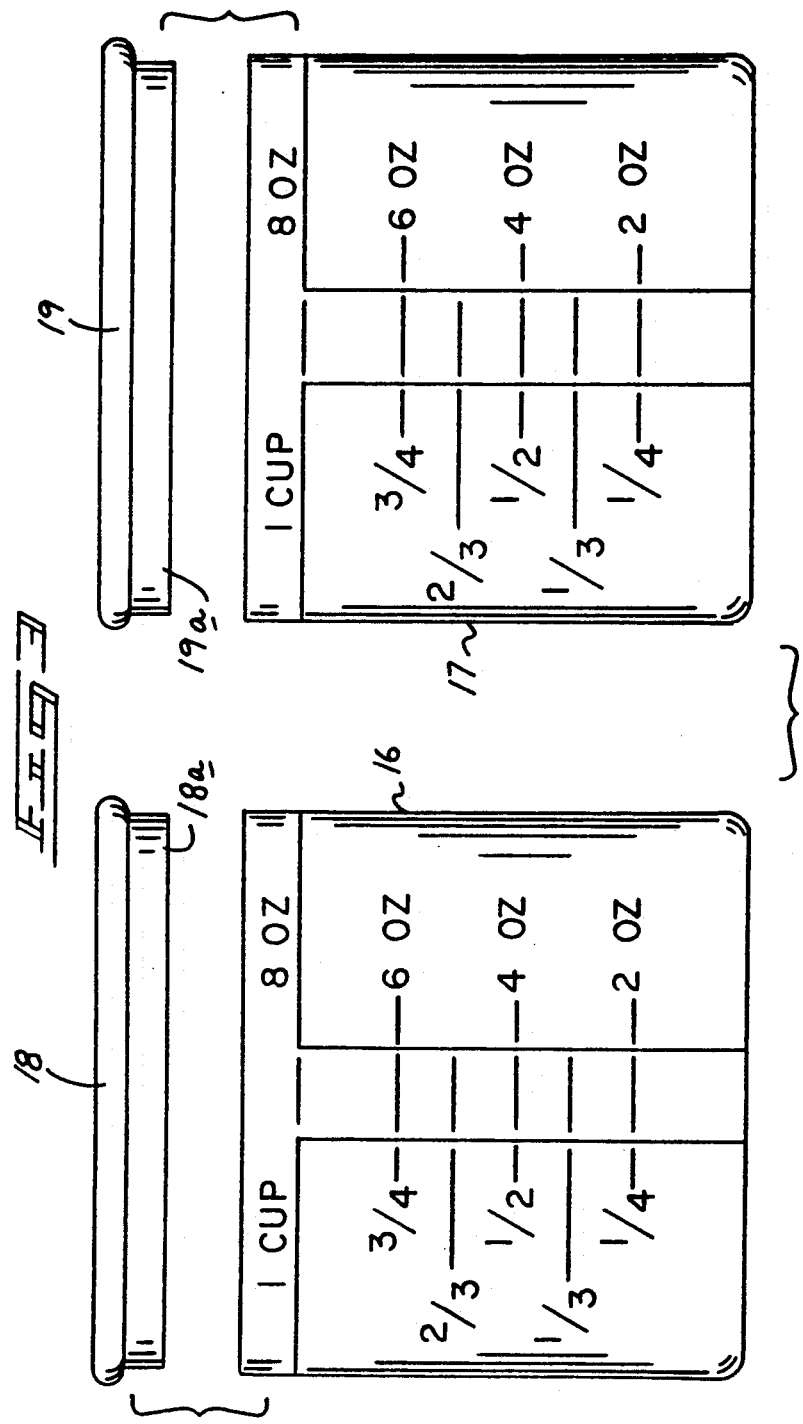

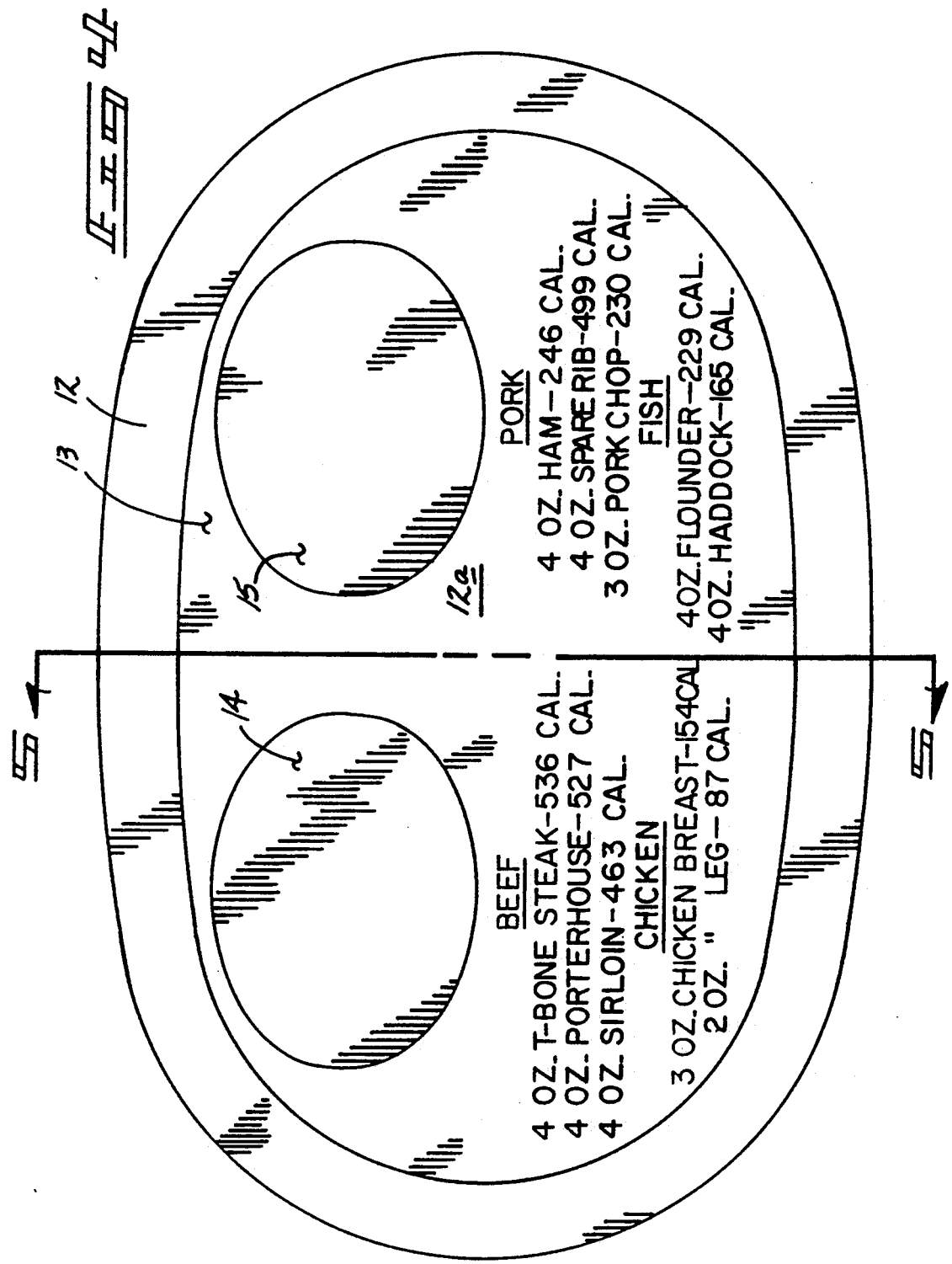

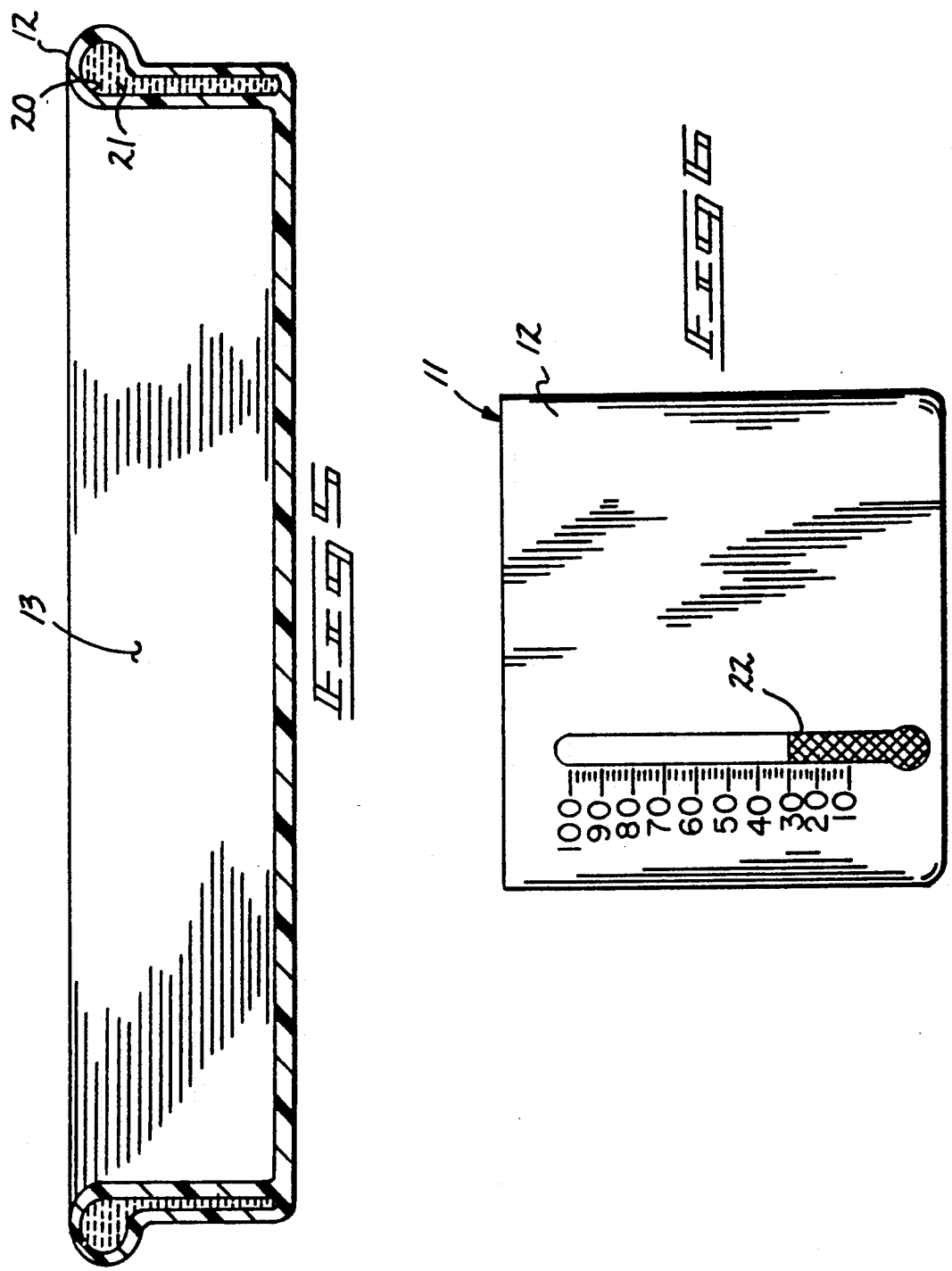

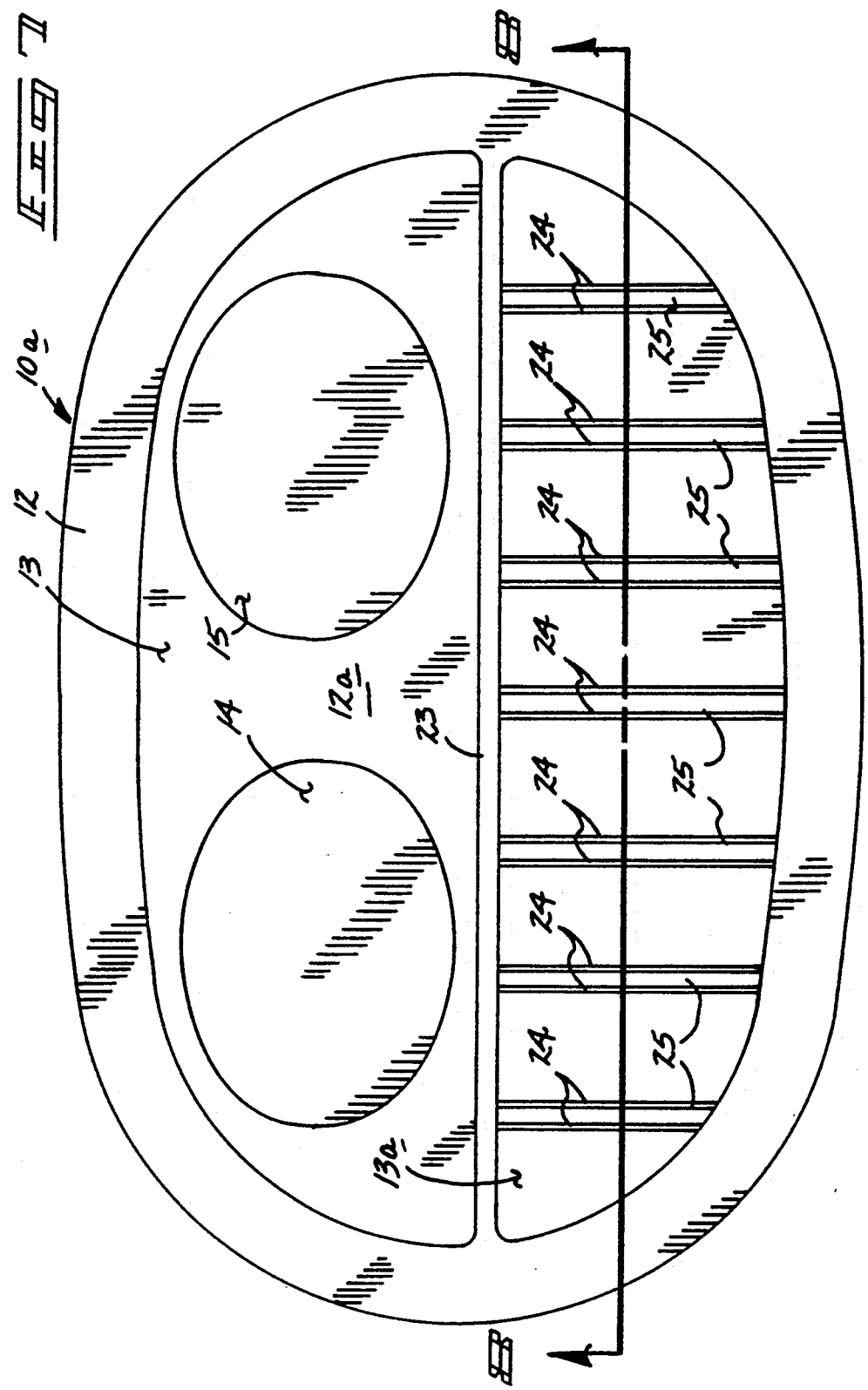

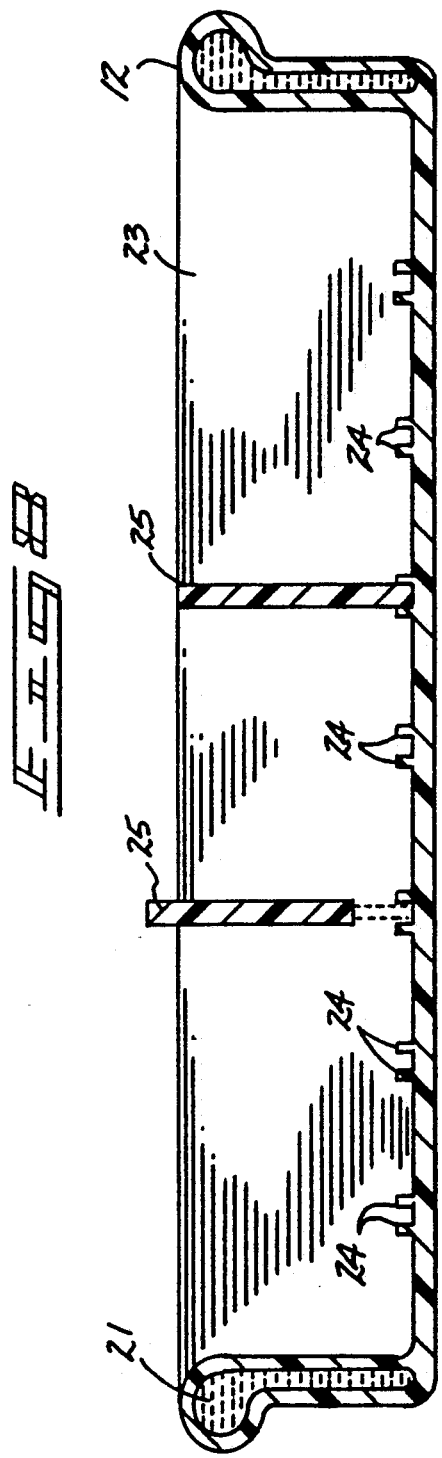

FOOD METERING DISH

BACKGROUND OF THE INVENTION

1. Field of the Invention

The field of invention relates to dieting aids, and more particularly pertains to a new and improved food metering dish wherein the same enables effective heat retention and food quantity apportionment within a dish.

2. Description of the Prior Art

The use of various measuring devices and dieting assists have been known in the prior art. The devices are particularly useful to individuals requiring selective quantities and portions of foods in an effort to attain a predetermined body weight. Examples of the prior art include U.S. Pat. No. 2,526,602 to Crumrine wherein a receptacle kit includes an interior cavity, wherein an interior annular wall contains a series of cup-shaped receptacles mounted on the wall for receiving various food portions therewithin.

U.S. Pat. No. 3,498,136 to Le May wherein a dish member includes pie-shaped metering portions contained in an annular array within the device.

U.S. Pat. No. 2,556,782 to Venters sets forth ingredient dispensers including a rotary bottom for enabling bottom discharge of condiments and food through the dispensers.

U.S. Pat. No. 4,334,361 to Gorski, et al., sets forth a gauge device wherein an elongate container includes markings with a removable end member to enable selective removal of predetermined quantities of food from the device.

U.S. Pat. No. 4,165,565 to Clouter, et al., sets forth a food meter wherein a base includes four upstanding walls defining three spaces for the metering of spaghetti-like foods between the walls.

As such, it may be appreciated that there is a continuing need for a new and improved food metering dish which addresses both the problems of ease of use, as well as effectiveness in construction, in enabling individuals to ascertain and maintain a desired temperature gradient for quantities of food contained within the device.

SUMMARY OF THE INVENTION

In view of the foregoing disadvantages inherent in the known types of metering devices now present in the prior art, the present invention provides a food metering dish wherein the same enables selective metering of food as a dietary aid to individuals. As such, the general purpose of the present invention, which will be described subsequently in greater detail, is to provide a new and improved food metering dish which has all the advantages of the prior art food metering devices and none of the disadvantages.

To attain this, the present invention includes an apparatus for use as a dieting aid by individuals, wherein a dish member includes a continuous surrounding wall defining an interior cavity. The interior cavity includes first and second concave recesses for receiving metered containers therewithin that each include metering designations consistent with dieting portions available to an individual. The containers each include sealing lids selectively securable thereon for maintaining freshness and temperature within the containers. The continuous wall includes a cavity filled with a mineral oil to retain heat within the cavity and impart such heat to food contained within the interior cavity of the dish. A thermometer is integrally and optionally formed to an exterior surface of the wall, and additionally the dish may include a medial partition wall with spaced pairs of ribs containing selectively partitionable partition walls between the ribs for selective control of food portions contained between the partition walls.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therfore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved food metering dish which has all the advantages of the prior art food metering devices and none of the disadvantages.

It is another object of the present invention to provide a new and improved food metering dish which may be easily and efficiently manufactured and marketed.

It is a further object of the present invention to provide a new and improved food metering dish which is of a durable and reliable construction.

An even further object of the present invention is to provide a new and improved food metering dish which is susceptible of a low cost of manufacture with regard to both materials and labor, and which accordingly is then susceptible of low prices of sale to the consuming public, thereby making such food metering dishes economically available to the buying public.

Still yet another object of the present invention is to provide a new and improved food metering dish which provides in the apparatuses and methods of the prior art some of the advantages thereof, while simultaneously overcoming some of the disadvantages normally associated therewith.

Still another object of the present invention is to provide a new and improved food metering dish wherein the same enables the selective apportionment of predetermined quantities of food within the dish while simultaneously maintaining a predetermined temperature gradient of the dish relative to the food.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view taken in elevation of the container as utilized by the instant invention.

FIG. 4 is a top orthographic view of the instant invention.

FIG. 5 is an orthographic view taken along the lines 5—5 of FIG. 4 in the direction indicated by the arrows.

FIG. 6 is an orthographic side view taken of the metering dish of the instant invention.

FIG. 7 is an orthographic plan view of a modified food metering dish of the instant invention.

FIG. 8 is an orthographic view taken along the lines 8—8 of FIG. 7 in the direction indicated by the arrows.

DESCRIPTION OF THE PREFERRED EMBODIMENT

Figure 1:
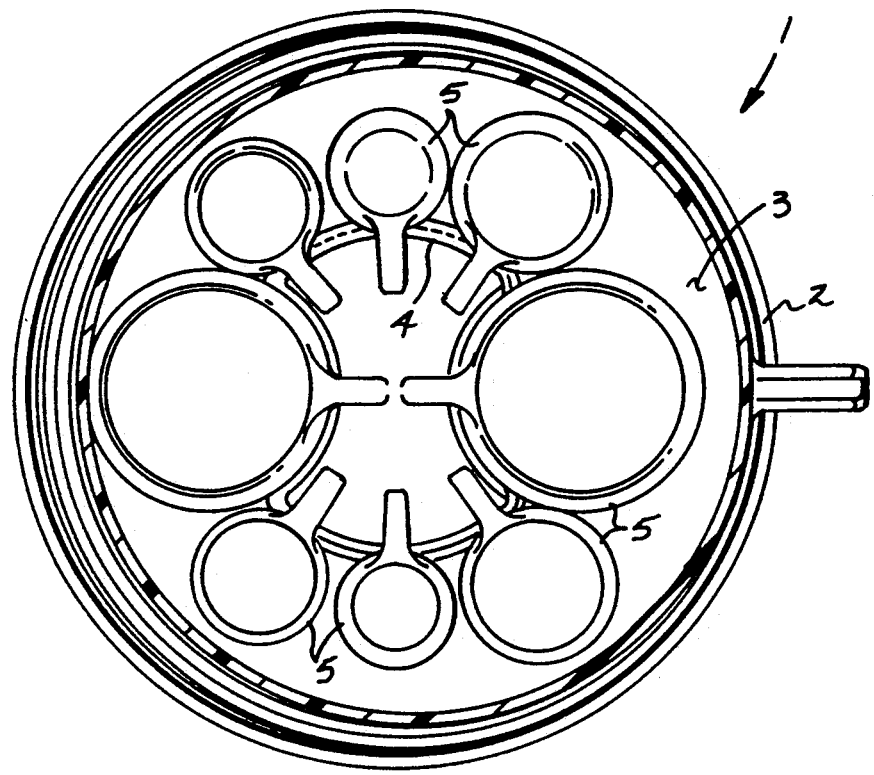
FIG. 1 is a top plan view of a prior art food metering device.
Figure 2:
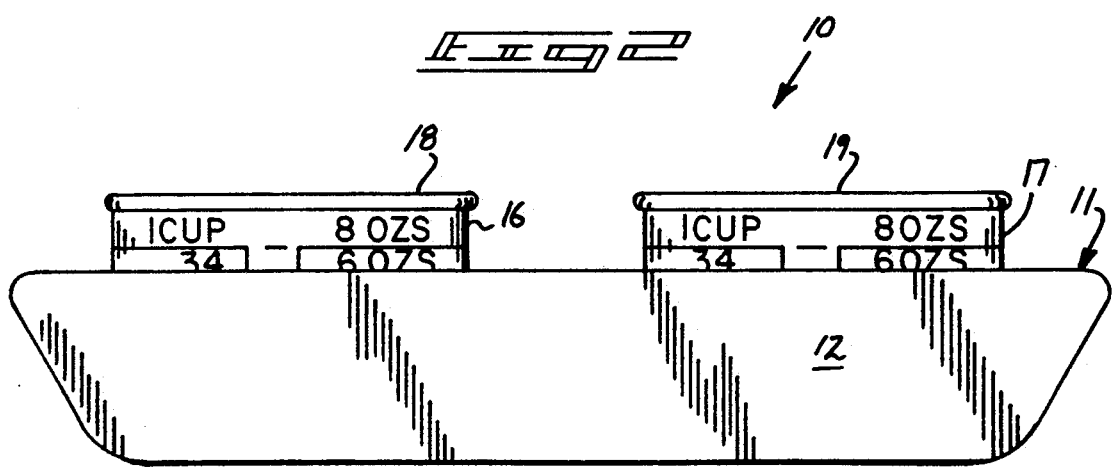
FIG. 2 is an orthographic side view taken in elevation of the food metering dish of the instant invention.

With reference now to the drawings, and in particular to FIGS. 1 to 8 thereof, a new and improved food metering dish embodying the principles and concepts of the present invention and generally designated by the reference numerals 10 and 10a will be described.

A prior art food metering dish 1, as illustrated in FIG. 1, wherein an annular container 2 is defined by an interior cavity 3, wherein an interior, annular coaxial wall 4 provides storage for a series of measuring type cups 5 contained within the interior annular wall.

More specifically, the food metering dish 10 of the instant invention essentially comprises a dish member 11 defined by a continuous surrounding wall 12. The surrounding wall 12 defines an interior cavity 13 within a dish member 11, wherein a first and second spaced concave recess 14 and 15 are positioned aligned relative to one another and spaced adjacent the wall 12. The dish 11 is defined generally as an elliptical configuration wherein the recesses 14 and 15 are positioned both on one side of a major axis defined by the elliptical configuration. Further, the top surface of the floor 12a of the dish member 11 includes a series of dietary aids in the form of caloric equivalence of food portions. The first and second concave recesses 14 and 15 are configured to receive first and second metering containers 16 and 17 defined by an external diameter of complementary configuration to an internal diameter defined by the first and second recesses 14 and 15. The containers 16 and 17 each include measuring indicia thereon to assist an individual in ascertaining quantities of food and caloric equivalence in association with the food equivalency designations of the floor 12a of the dish member 11. Each of the containers 16 and 17 include a sealing lid defined by a first and second respective sealing lid 18 and 19 securable to a respective first and second containers 16 and 17. The lids 18 and 19 each include a respective first and second recesses annular skirt 18a and 19a sealingly received within the first and second containers and accordingly define an external diameter substantially equal to the internal diameter defined by the containers 16 and 17.

FIG. 5 is illustrative of the construction of the wall 12, wherein the wall 12 is hollow and defines a surrounding chamber 20 surrounding the interior cavity 13. The chamber 20 is completely filled with a mineral oil 21 to retain heat, whereupon the mineral oil liquid within the chamber 20 may be elevated to predetermined temperature to maintain a temperature gradient to maintain a predetermined elevated temperature of food contained within the dish 11.

FIG. 6 is illustrative of an integral thermometer 22 integrally formed to an exterior surface of the wall 12 to enable an individual to ascertain the desired preheated temperature of the mineral oil 21 as the thermometer 22 is in contact with the mineral oil to ascertain such temperature.

FIGS. 7 and 8 are illustrative of the modified food metering dish 10a wherein the annular wall 12 is of a comparable configuration to that as defined by the metering dish 10, but wherein a major partition wall 23 is coextensive with and aligned with the major axis of the elliptical dish 10a to define symmetrical chambers 13 and 13a to each side of the major axis. The first and second concave recesses 14 and 15 respectively contain the respective first and second metering containers 16 and 17 and are positioned to one side of the partition wall 23, but wherein a plurality of spaced pairs of ribs 24 are orthogonally and integrally formed to the floor 12a of the modified metering dish, wherein the spaced pairs of ribs 24 contain removable partition walls 25 which are arranged orthogonally relative to the major partition wall 23 and are coextensive with the cavity 13a and orthogonally directed thereacross to thereby control sizes of food portions contained between partition walls 25. Accordingly, a predetermined number of partition walls may be removed or replaced between the pairs of ribs 24 to provide desired food portions for consumption by an individual. It should be noted that the partition walls are defined by a predetermined height equal to a predetermined height defined by the major partition wall 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A food metering dish including,
   a floor and a continuous wall directed upwardly and in surrounding relationship to the floor to define a cavity within the dish, and
   a first and second concave recess integrally formed within the floor, and
   a first and second container selectively positionable within the first and second respective concave recess to maintain positioning of the first and second container relative to the floor, and
   wherein the first and second container each includes measuring gradients formed to the container to enable an individual to ascertain individual portions within the container, and
   wherein the first and second container each includes a respective first and second lid, the first and second containers defined by a respective first and second internal diameter, and the first and second lid each including an annular skirt defining an external diameter equal to the internal diameter of the first and second container, and
   wherein indicia are imparted on the floor to provide caloric equivalence of preselected foods, and
   wherein the continuous wall is hollow and defines a surrounding chamber therewithin in surrounding relationship relative to the floor, and
   further including a thermometer integrally formed within the wall in contact with the chamber, and
   wherein the chamber is completely filled with a mineral oil which may be heated to an elevated temperature to maintain a predetermined temperature gradient relative to foods contained within the cavity, and
   wherein the dish is defined as an ellipse, and the floor is defined as an ellipse, and further including a major partition wall coextensive with and directed across the floor aligned with a major axis defined by the floor, and the first and second concave recess positioned aligned relative to one another on a first side of the major partition, and
   wherein a second side of the major partition defines a further cavity between the second side of the major partition and an interior surface of the wall, and further including plural pairs of spaced ribs integrally formed to the floor between the second side of the partition and the interior surface of the wall, and further including partition walls defined by a width substantially equal to a predetermined width between the plural pairs of ribs for selective positioning of the partition walls between the ribs to control food portions contained between the partition walls, and the partition walls defined by a height equal to a predetermined height defined by the major partition wall.

* * * * *